United States Patent
Knittel et al.

(10) Patent No.: US 7,852,714 B2
(45) Date of Patent: Dec. 14, 2010

(54) COMPACT PICKUP FOR MICRO OPTICAL DRIVE

(75) Inventors: Joachim Knittel, Tuttlingen (DE); Hartmut Richter, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 428 days.

(21) Appl. No.: 11/920,818

(22) PCT Filed: May 3, 2006

(86) PCT No.: PCT/EP2006/061998

§ 371 (c)(1),
(2), (4) Date: Nov. 20, 2007

(87) PCT Pub. No.: WO2006/128767

PCT Pub. Date: Dec. 7, 2006

(65) Prior Publication Data

US 2009/0129244 A1    May 21, 2009

(30) Foreign Application Priority Data

May 30, 2005    (EP) .................................. 05011586

(51) Int. Cl.
*G11B 7/00* (2006.01)
(52) U.S. Cl. ............................. 369/44.12; 369/112.09; 369/112.26
(58) Field of Classification Search ............ 369/112.01, 369/44.12, 44.14, 112.02, 112.09, 112.23, 369/112.26, 44.23, 44.24
See application file for complete search history.

(56) References Cited

U.S. PATENT DOCUMENTS 4,030,815 A    6/1977    Andrevski et al.
(Continued)

FOREIGN PATENT DOCUMENTS

EP    0341829    11/1989
(Continued)

OTHER PUBLICATIONS

Patent Abstracts of Japan, vol. 2003, No. 01, Jan. 14, 2003 & JP 2002-251758.
(Continued)

*Primary Examiner*—Nabil Z Hindi
(74) *Attorney, Agent, or Firm*—Robert D. Shedd; Jeffrey M. Navon

(57) ABSTRACT

The invention relates to a compact optical pickup for a micro optical drive, and to a micro optical drive using this compact optical pickup. According to the invention a pickup for optical recording media includes a light source for generating a light beam for reading from and/or writing to an optical recording medium, a flexible arm serving as a focus actuator, an objective lens situated on the flexible arm for focusing the light beam onto the optical recording medium, an optical bench for directing the light beam towards the optical recording medium one or more detectors for detecting the light beam reflected by the optical recording medium, and a mirror, which is arranged inclined with respect to a transparent block of the optical bench, for directing the light beam reflected by the optical recording medium towards a first detector.

7 Claims, 1 Drawing Sheet

U.S. PATENT DOCUMENTS

Figures 1, 2:
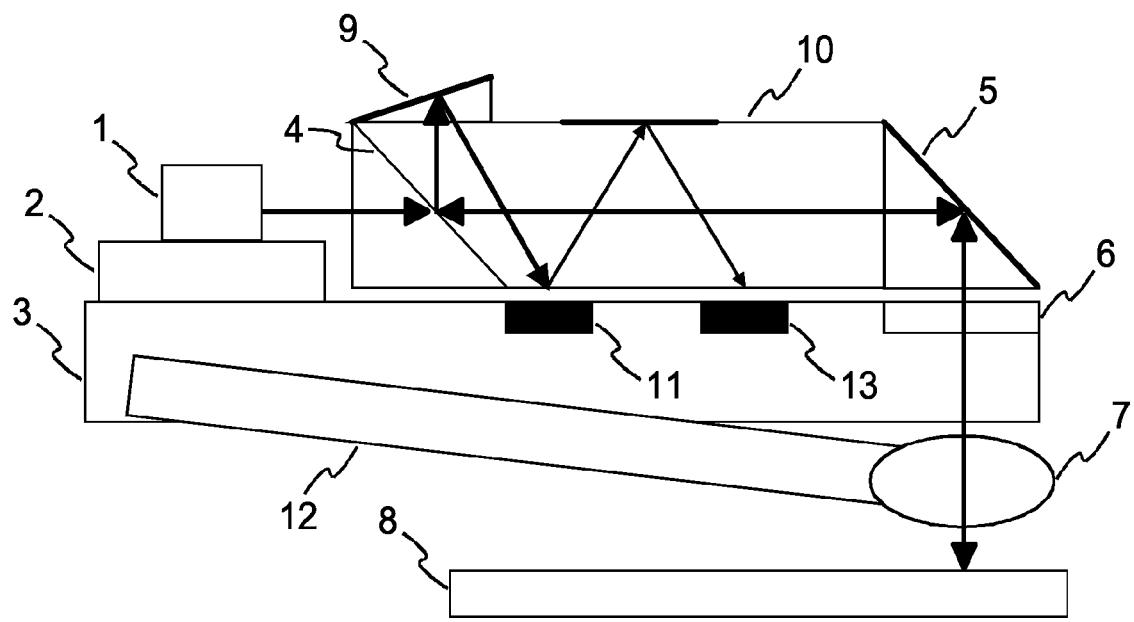

| | | | |
|---|---|---|---|
| 5,853,294 A * | 12/1998 | Rehder | 439/17 |
| 6,081,496 A * | 6/2000 | Otsubo et al. | 369/112.26 |
| 6,215,755 B1 | 4/2001 | Snyder et al. | |
| 6,266,314 B1 * | 7/2001 | Fukakusa et al. | 369/112.01 |
| 6,275,454 B1 | 8/2001 | Boutaghou et al. | |
| 6,717,893 B1 | 4/2004 | Niss et al. | |
| 6,873,580 B2 * | 3/2005 | Zimmer et al. | 369/44.12 |
| 7,280,457 B2 * | 10/2007 | Kobayashi et al. | 369/112.09 |
| 7,428,194 B2 * | 9/2008 | Sohn et al. | 369/44.23 |
| 7,471,595 B2 * | 12/2008 | Yoon et al. | 369/44.12 |
| 2002/0075773 A1 | 6/2002 | Lee | |

FOREIGN PATENT DOCUMENTS

| | | |
|---|---|---|
| EP | 1253587 | 10/2002 |
| JP | 2002-251758 | 1/2003 |
| WO | WO 02/059893 | 8/2002 |
| WO | WO 03/102939 | 12/2003 |
| WO | WO 2004/010201 | 1/2004 |
| WO | WO 2004/059630 | 7/2004 |

OTHER PUBLICATIONS

S.B. Luitjens et al: "Small Form Factor Portable-Blue Drive: Power Consumption Considerations" IEEE Transactions on Consumer Electronics, IEEE INC. NY, US, vol. 49, No. 3, Aug. 2003, pp. 637-641.

Search Report Dated Jul. 4, 2006.

* cited by examiner

| lens tilt [degree] | RMS [mλ] NA=0.80 | RMS [mλ] NA=0.85 |
|---|---|---|
| 0 | 1 | 1 |
| 0.2 | 9 | 13 |
| 0.4 | 18 | 26 |

COMPACT PICKUP FOR MICRO OPTICAL DRIVE

This application claims the benefit, under 35 U.S.C. §365 of International Application PCT/EP2006/061998, filed May 3, 2006, which was published in accordance with PCT Article 21(2) on Dec. 7, 2006 in English and which claims the benefit of European patent application No. 05011586.4, filed May 30, 2005.

The invention relates to an optical pickup for a micro optical drive, and to a micro optical drive using this optical pickup.

Drives for optical recording media such as the Compact Disk (CD) or the Digital Versatile Disk (DVD) have long been established. Recently a new generation of optical recording media with an increased recording density using blue light has been developed. These Recording media include the Blu-Ray Disk (BD) and the High Density DVD (HD-DVD). However, especially for portable electronic devices, micro optical drives for miniaturized optical recording media are needed. An example of such a miniaturized optical recording medium is the so-called CoinDisk.

Micro optical drives do generally not employ a sled-based pickup for reading from and/or writing to an optical recording medium. Instead, a tracking arm as known from hard disk drives is used for this purpose. For example, US 2004/0257928 discloses an optical pickup for a micro optical disk drive, which comprises a tracking arm to which a focusing arm is connected rotatably in the focusing direction. On the focusing arm the complete optical system is mounted.

It is an object of the present invention to propose an even more compact design for an optical pickup for a micro optical drive.

According to the invention, this object is achieved by a pickup for optical recording media, with a light source for generating a light beam for reading from and/or writing to an optical recording medium, a flexible arm serving as a focus actuator, an objective lens situated on the flexible arm for focusing the light beam onto the optical recording medium, an optical bench for directing the light beam towards the optical recording medium, one or more detectors for detecting the light beam reflected by the optical recording medium, and a mirror, which is arranged inclined with respect to a transparent block of the optical bench, for directing the light beam reflected by the optical recording medium towards a first detector. The mirror is advantageously bonded to the transparent block, which also carries further optical elements. To miniaturize the pickup it is advantageous to place only the objective lens on a leaf spring like actuator instead of the entire pickup optics. The design is particularly suitable for use with blue light sources having a wavelength between 380 and 415 nm, and small optical recording media with a diameter of 3 cm. For optimizing the design for a maximum storage capacity, the objective lens favorably has a numerical aperture between 0.75 and 0.85.

Preferably, the flexible arm is preloaded in such a way that it has a maximum separation from the optical recording medium when no voltage is applied to it. As micro optical drives are typically operated in burst mode, this saves electric energy. Furthermore, a protection of the objective lens when the micro optical drive is switched off is achieved.

Advantageously, finite optics are used for imaging the light source onto the optical recording medium. This allows to omit a collimating lens, hence reducing the number of required optical components.

Preferably, the first detector has a reflective surface, which directs a fraction of an incident light beam towards a second detector. This allows to further reduce the size of the pickup, as an additional beam splitter or mirror for directing a part of the reflected light beam towards the second detector can be omitted.

According to a further aspect of the invention, the light source is arranged on a heat sink in such a way that it is cooled by an air-current generated by rotation of the optical recording medium. This allows to effectively use the air-current generated by the optical recording medium for cooling, thus making a further cooling unnecessary.

A pickup according to the invention is advantageously used in an apparatus for reading from and/or writing to optical recording media.

For a better understanding the invention shall now be explained in more detail in the following description with reference to the figures. It is understood that the invention is not limited to this exemplary embodiment and that specified features can also expediently be combined and/or modified without departing from the scope of the present invention. In the figures:

FIG. 1 schematically depicts an optical pickup according to the invention; and

FIG. 2 shows the simulation results for the wavefront deformation caused by a movement of the objective lens.

FIG. 1 schematically depicts an optical pickup according to the invention. A laser source 1 is located on a heat sink 2 and fixed to an optical bench 3. The laser radiation is transmitted through a polarizing beam-splitter 4, which is bonded to a transparent block 10, reflected by a mirror 5 and circularly polarized by a quarter wave-plate 6. An objective lens 7, which is fixed to a leaf spring 12 serving as a focus actuator, forms a diffraction limited spot on an optical recording medium 8. Coils and magnets (not shown) are used for moving the leaf spring 12 for focus control. The leaf spring 12 is preloaded in such way that the distance between the objective lens 7 and the optical recording medium 8 is as large as possible when no current is applied. This saves a lot of electric energy, as micro optical drives are typically operated in burst mode. In addition, this also helps to protect the objective lens 7 when the micro optical drive is switched off. In the back path the returning light is deflected by the polarizing beam-splitter 4 and directed towards a detector 11 by a further mirror 9, which is mounted in an inclined manner on the transparent block 10. The detector 11 reflects about 50% of the incoming light, which is directed towards a further detector 13 after reflection at the upper surface of the transparent block 10. Focus error detection is preferably achieved by spot-size detection. For tracking the whole optical pickup is advantageously placed on a swing-arm pivotable in tracking direction.

The depicted design of the optical pickup has the advantage of leading to a very compact optical pickup, as only a very small number of optical components is necessary. To reduce the number of optical elements, no collimating lens is used (so-called finite optics). As can be seen from the figure, only five optical elements are needed: The polarizing beam-splitter 4 (realized as a prism), the inclined mirror 9, the transparent block 10, which includes the mirror 5, the quarter-wave plate 6, and the objective lens 7. Only four optical elements are necessary if also the inclined mirror 9 is integrated into the transparent block 10. In addition, as the optical bench 3 and the heat sink 2 are exposed to an air current from the rotating optical recording medium, this air current can effectively be used for cooling. A further advantage of the design is that a single substrate is used for the detectors 11, 13 and the laser source 1.

During operation the focus actuator (leaf spring 12) causes a tilt of the objective lens 7 and also changes the distance of the objective lens 7 to the laser source 1. FIG. 2 shows the simulation results for the wavefront deformation caused by a movement of the objective lens 7. To obtain these results the optical system was simulated with ray tracing. The following assumptions were made:

1) The length of the leaf spring actuator 12 is in the order of 2 cm. This is a reasonable value provided a small optical recording medium 8 with the quasi-standard diameter of 3.0±0.2 cm is used.
2) The vertical movement range of the leaf spring actuator 12 should be at least ±75 μm. This value is obtained by downscaling form the BluRay disk standard.
3) The cover-layer thickness of the optical recording medium 8 is chosen to be in the range of 50 to 100 μm.

For the given optical system a lens tilt of 0.38° causes a vertical shift of ±75 μm. A standard requirement for optical drives using blue light is that the wavefront aberration (RMS) should be below 30 mλ. As can be seen from the table of FIG. 2, this condition is fulfilled even for an objective lens 7 having a numerical aperture (NA) of 0.85. For this NA and a vertical shift of ±75 μm the wavefront aberration is 18 mλ. The simulation results indicate that the NA for the proposed system should be in the range of 0.75 to 0.85, in order to yield sufficient margins for aberrations and to obtain a high storage capacity, as the storage capacity scales with $NA^2$.

The invention claimed is:

1. Pickup for optical recording media, with:
   a light source for generating a light beam,
   a flexible arm serving as a focus actuator,
   an objective lens situated on the flexible arm for focusing the light beam onto the optical recording medium, the objective lens being the only optical element situated on the flexible arm,
   an optical bench and a transparent block for directing the light beam towards the optical recording medium,
   at least a first detector and a second detector arranged on said optical bench for detecting a light beam reflected by the optical recording medium, wherein said first detector has a reflective surface for directing a fraction of the light beam reflected by the optical recording medium towards said second detector, and
   a mirror arranged on said transparent block and inclined with respect to a surface of said transparent block for directing the light beam reflected by the optical recording medium towards said first detector.

2. Pickup according to claim 1, wherein the flexible arm is preloaded in such a way that it has a maximum separation from the optical recording medium when no voltage is applied to it.

3. Pickup according to claim 1, wherein finite optics are used for imaging the light source onto the optical recording medium.

4. Pickup according to claim 1, wherein the light source is arranged on a heat sink in such a way that it is cooled by an air-current generated by rotation of the optical recording medium.

5. Pickup according to claim 1, wherein the light source has a wavelength of 380 to 415 nm.

6. Pickup according to claim 1, wherein the objective lens has a numerical aperture between 0.75 and 0.85.

7. Apparatus for reading from and/or writing to optical recording media, wherein it includes an optical pickup according to claim 1.

* * * * *